United States Patent
Gouget (10) Patent No.: US 11,362,836 B2
(45) Date of Patent: Jun. 14, 2022

(54) CONSENSUS PROTOCOL FOR PERMISSIONED LEDGERS

(71) Applicant: Thales Dis France SA, Meudon (FR)

(72) Inventor: Aline Gouget, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 221 days.

(21) Appl. No.: 16/633,879

(22) PCT Filed: Jul. 17, 2018

(86) PCT No.: PCT/EP2018/069347
§ 371 (c)(1),
(2) Date: Jan. 24, 2020

(87) PCT Pub. No.: WO2019/020428
PCT Pub. Date: Jan. 31, 2019

(65) Prior Publication Data
US 2020/0169416 A1 May 28, 2020

(30) Foreign Application Priority Data
Jul. 25, 2017 (EP) .................................... 17305991

(51) Int. Cl.
*H04L 9/32* (2006.01)
*G06F 21/60* (2013.01)
*H04L 9/08* (2006.01)

(52) U.S. Cl.
CPC .......... *H04L 9/3247* (2013.01); *G06F 21/602* (2013.01); *H04L 9/0869* (2013.01); *H04L 2209/38* (2013.01); *H04L 2209/56* (2013.01)

(58) Field of Classification Search
CPC .... H04L 9/3247; H04L 9/0869; G06F 21/602
(Continued)

(56) References Cited

U.S. PATENT DOCUMENTS

2009/0116511 A1* 5/2009 Anderson ............... H04L 45/00
370/468
2017/0359181 A1* 12/2017 Chari ..................... H04L 9/3247
(Continued)

FOREIGN PATENT DOCUMENTS

AU 2016101976 A4 12/2016

OTHER PUBLICATIONS

Zheng Zibin et al: "An Overview of Blockchain Technology: Architecture, Consensus, and Future Trends", 2017 IEEE International Congress on Big Data (Bigdata Congress, IEEE, Jun. 25, 2017 (Jun. 25, 2017), pp. 557-564, XP033151568, DOI: 10.1109/BIGDATACONGRESS. 2017.85 Abstract, Sections I, II, III.
(Continued)

*Primary Examiner* — Jacob Lipman
(74) *Attorney, Agent, or Firm* — The Jansson Firm; Pehr B. Jansson (57) ABSTRACT

The present invention relates to a method for reaching a consensus for appending, at a current round (j), a new block of data to a permissioned ledger distributed through a network comprising network connected devices authorized by the ledger, called nodes,
said method being performed by a tamper-proof computing device configured for managing securely digital keys and comprising a random number generator and a cryptoprocessor for generating signatures with said keys, and comprising, for a set of transactions to be validated, the steps of:
receiving, from at least a first node ($N_k$), a candidate block ($B_{j,Nk}$) computed by said first node on transactions among said set of transactions,
for each received candidate block, generating a random value by the random number generator, and generating a signed selection message comprising: an identifier of
(Continued)

the current round (j), said received candidate block ($B_{j,Nk}$) and said generated random value by said cryptoprocessor, broadcasting said signed selection messages to the nodes of said network, enabling them to select the new block ($B_j$) to be appended to the ledger for the current round based on said random values comprised in said signed selection messages.

15 Claims, 3 Drawing Sheets

(58) Field of Classification Search
USPC .......................................................... 713/176
See application file for complete search history.

(56) References Cited

U.S. PATENT DOCUMENTS

2018/0337769 A1* 11/2018 Gleichauf ............. H04L 9/3247
2019/0236298 A1* 8/2019 Agarwal ............... H04L 9/3236

OTHER PUBLICATIONS

Sankar Lakshmi Siva et al: "Survey of consensus protocols on blockchain applications", 2017 4th International Conference on Advanced Computing and Communication Systems (ICACCS), IEEE, Jan. 6, 2017 (Jan. 6, 2017), pp. 1-5, XP033144744, DOI: 10.1109/ICACCS.2017.8014672 the whole document.

* cited by examiner

CONSENSUS PROTOCOL FOR PERMISSIONED LEDGERS

FIELD OF THE INVENTION

The present invention relates to the field of protocols for distributed ledgers, and of associated cryptographic devices, and more particularly to cryptographic devices for a new consensus protocol suited for permissioned ledgers.

BACKGROUND OF THE INVENTION

Distributed ledgers such as the blockchain technology provide a secure but decentralized way to save information, for example the chronology of financial transactions between participants and possibly the transaction data itself. Such a ledger is distributed between multiple nodes of the network in charge of registering new data to the ledger, for example by appending new data blocks to a blockchain. In case of data representing financial transactions, these nodes may also be in charge of verifying that transactions submitted by the users are legitimate.

Since such ledgers are decentralized, it is required that all nodes of the network agree on a consensus protocol for determining the validity of data appended to the ledger, and more precisely for determining the node that will be granted the permission to append the next block to the ledger.

Many different consensus protocols have been defined. Most of these consensus protocols are adapted to permission-less, also called public, ledgers. In such ledgers anyone can join the ledger, access its data and submit data to be appended to the ledger. A first example of such a consensus protocol is the "proof-of-work" in which data to be added to the ledger are validated by performing complex calculations. In other words, nodes shall prove that they have dedicated a significant amount of computational resources to the ledger before any data they append to the ledger may be considered as valid. Another example of consensus protocol is the "proof-of-stake" in which the validity of data appended to the ledger is determined based on an amount of a token of value used within the network, such as ledger based crypto-currencies, owned by the nodes appending the data. A last example is the "practical Byzantine fault tolerance" protocol in which nodes come to a consensus after multiple rounds of voting and exchanging messages.

Another kind of distributed ledger is permissioned ledgers, also called private ledgers or consortium ledgers, in which access to the ledger data is controlled and only authorized nodes may join the ledger and submit data to be appended to the ledger. An example of such a ledger is a ledger between banking establishments knowing each other and exchanging financial data. Since all nodes participating to such a ledger are approved by the other nodes, existing consensus protocols requiring a node to give a proof of his trustworthiness are badly suited for private ledgers. A consensus protocol for such ledgers shall be energy efficient, shall be time-efficient, allowing a small waiting time between successive additions of data to the ledger, and most of the time it shall not require using any token of value within the ledger network.

As a result, there is a need for a new consensus protocol for distributed ledgers, adapted to private ledgers and inducing a limited consumption of both processing power and time.

SUMMARY OF THE INVENTION

For this purpose and according to a first aspect, this invention therefore relates to method for reaching a consensus for appending, at a current round, a new block of data to a permissioned ledger distributed through a network comprising network connected devices authorized by the ledger, called nodes, said method being performed by a tamper-proof computing device configured for managing securely digital keys and comprising a random number generator and a cryptoprocessor for generating signatures with said keys, and comprising, for a set of transactions to be validated, the steps of:

receiving, from at least a first node, a candidate block computed by said first node on transactions among said set of transactions, for each received candidate block, generating a random value by the random number generator, and generating a signed selection message comprising: an identifier of the current round, said received candidate block and said generated random value by said cryptoprocessor, broadcasting said signed selection messages to the nodes of said network, enabling them to select the new block to be appended to the ledger for the current round based on said random values comprised in said signed selection messages.

Such a method enables the nodes of the network to come to a consensus at a low cost and guaranties equal chances for all the nodes to append data to the ledger. It also guaranties some protection against fraud attempts using forged random values.

The method according to the first aspect may comprise receiving from said first node a signature of a message comprising the candidate block computed by said first node.

It enables the tamper-proof computing device to ascertain the origin of a received candidate block.

The method according to the first aspect may comprise, when receiving said candidate block, checking the validity of the candidate block.

It enables to discard valid candidate blocks that would include errors or that would result of a fraud attempt.

Said signed selection message may comprise also the block selected to be appended to the ledger at the last round. It may help the nodes receiving it to store a local copy of the ledger. It may also help the nodes to identify communication issues when multiple incoherent selection messages are received.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a tamper-proof computing device for reaching a consensus for appending, at a current round, a new block of data to a permissioned ledger distributed through a network comprising network connected devices authorized by the ledger, called nodes, said tamper-proof computing device being configured for managing securely digital keys and comprising a random number generator, a cryptoprocessor for generating signatures with said keys and an input-output interface wherein, for a set of transactions to be validated:

said interface is configured for receiving, from at least a first node, a candidate block computed by said first node on transactions among said set of transactions, said random number generator is configured for generating a random value for each received candidate block, said cryptoprocessor is configured for generating, for each received candidate block, a signed selection message comprising: an identifier of the current round, said received candidate block and said random value generated for said received candidate block, said interface is configured for broadcasting said signed selection messages to the nodes of said network, enabling them to select the new block to be appended to the ledger for the current round based on said random values comprised in said signed selection messages.

According to a fourth aspect, this invention therefore relates also to a system for reaching a consensus for appending, at a current round, a new block of data to a permissioned ledger distributed through a network comprising network connected devices authorized by the ledger called nodes, said system comprising, for a set of transactions to be validated:

at least one tamper-proof computing device according to the third aspect and, nodes of said network, each configured for:
  computing a candidate block on transactions among said set of transactions,
  sending to said tamper-proof computing device the computed candidate block,
  receiving said signed selection messages from said tamper-proof computing device,
  selecting, among the candidate blocks comprised in the received signed selection messages, the new block to be appended to the ledger for the current round based on said random values comprised in said signed selection messages.

Each node may be configured for selecting as the new block to be appended to the ledger for the current round the candidate block comprised in the signed selection message comprising the highest random value among received signed selection messages comprising the identifier of the current round.

It enables all the nodes to share a common and simple rule for efficiently coming to an agreement about which block should be appended to the ledger.

The first node may be configured for checking the validity of transactions of said set of transactions and for computing said candidate block only on valid transactions of said set of transactions.

It enables to discard invalid transactions, for example resulting of a fraud attempt, even before generating a candidate block.

The first node may be configured for generating a signature of a message that comprises the candidate block and for sending said signature to the tamper-proof computing device.

It enables the tamper-proof computing device to ascertain the origin of a received candidate block.

Each node may be configured for sending to said tamper-proof computing device information about said valid transactions on which said node computed said candidate block.

When a new block is selected to be appended to the ledger, at least one node may be configured for acknowledging the acceptance of the new block by generating and sending to the other nodes of the network a signed acknowledgment message including at least one data among:

the new block selected to be appended to the ledger at the current round or an identifier of said new block, the block selected to be appended to the ledger at the last round or an identifier of said block, information about the transactions on which said selected new block at the current round has been computed and that have also been successfully checked for validity by said node, information about the transactions on which said selected new block at the current round has been computed and that have been detected by said node as invalid, information about the transactions on which said selected new block at the current round has been computed and that have been detected by said node as suspicious, information about the transactions on which said selected new block at the current round has been computed and that have not been received by said node, and the nodes of the network may be configured for rejecting or confirming said new selected block based on the data comprised in said signed acknowledgment messages.

It enables all the nodes to verify how the new node selection was taken into account by the other participants to the ledger and to raise errors or warnings in case abnormal messages are received.

When the selected new block at current round is rejected, each node is configured for selecting as the new block to be appended to the ledger for the current round, the candidate block comprised in the selection message comprising the second highest random value among received signed selection messages comprising the identifier of the current round.

It enables the nodes to select a new block to be appended to the ledger despite a rejection of a first candidate block.

Said tamper-proof computing device may be shared between at least two nodes of said network.

It enables to limit the number of devices required for operating the ledger.

The system according to the fourth aspect may comprise one tamper-proof computing device for each node of said network.

It enables each node not to depend on remote devices for getting random numbers associated to its candidate blocks.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

A distributed ledger can be viewed as a database distributed among participants to the ledger, and which may be modified only by appending data to it. In such a ledger, data is stored under the form of an ordered list or chain of blocks. Since the database is distributed among numerous participants, each time data is proposed to be appended to the ledger by participants, all participants must agree on a rule, called consensus, defining the content of the next block to be appended to the ledger.

In such a context, the invention aims at enabling participants to a permissioned distributed ledger to reach rapidly and at a very limited cost a consensus about which participant shall be allowed to append the next block of data to the ledger.

Figure 1:
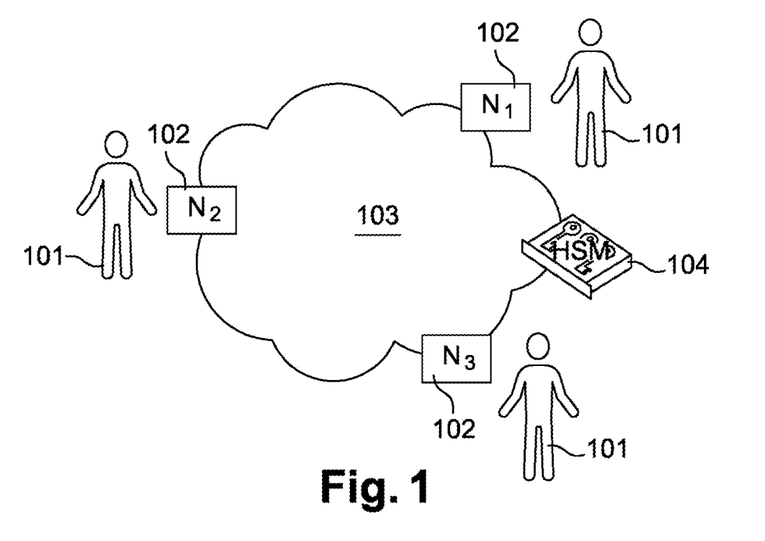
FIG. 1 is a schematic illustration of a system according to an embodiment of the present invention.

As depicted on FIG. 1, each participant 101 uses a network connected device 102, called node, authorized by the ledger, ie previously authorized by the other participants to participate to the ledger, and connected to the other network connected devices through a network 103. Such network connected devices may for example be smart cards, mobile phones, tablets, personal computers. Such a network may be a peer to peer network.

Figure 2:
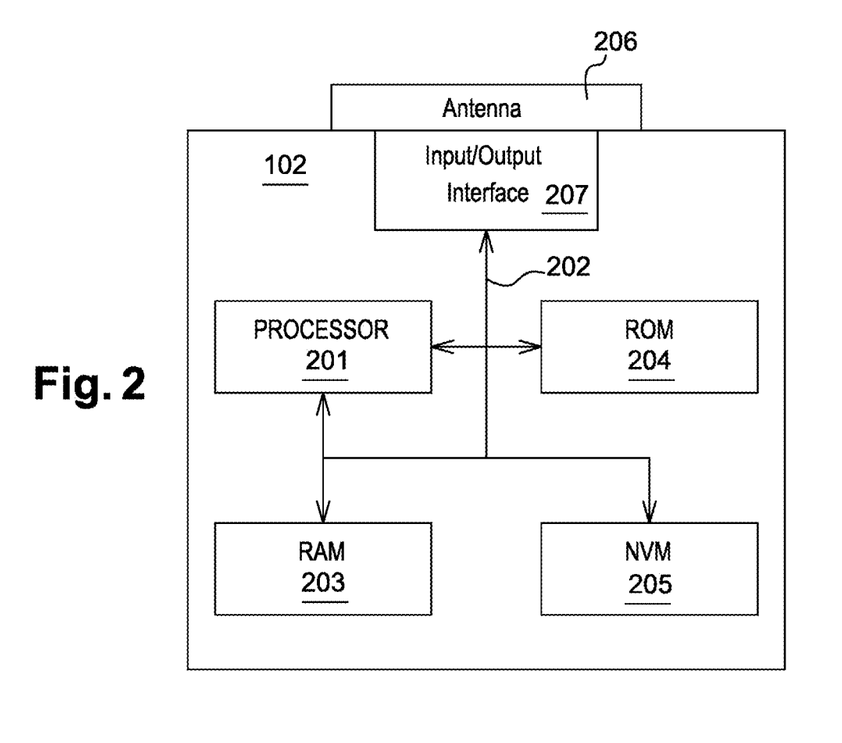
FIG. 2 is a schematic illustration of a node according to an embodiment of the present invention.

FIG. 2 is a schematic illustration of a node 102. The node may include a processor 201 connected via a bus 202 to a random access memory (RAM) 203, a read-only memory (ROM) 204, and/or a non-volatile memory (NVM) 205. The node may further include a connector connected to the bus and by which the client device may be connected to an antenna 206. Such an antenna may be used to connect the node to various forms of wireless networks, e.g., wide-area networks, WiFi networks, or mobile telephony networks. Alternatively, the node may connect to networks via wired network connections such as Ethernet. The node may also include an input/output interface 207 providing interfaces to the user of the client device, such as one or more screens, loudspeakers, a mouse, tactile surfaces, a keyboard etc. . . .

The main idea of the invention is to use trusted tamper-proof computing devices for distributing random numbers to the participants and to make the participants decide by consensus which participant will be allowed to append the next block of data to the ledger based on those random numbers.

In order to do so, one or more tamper-proof computing devices 104 are connected to the network 103 and may interact with the nodes 102 of the participants. Like the nodes, tamper-proof computing devices shall be recognized and authorized by the ledger.

Figure 3:
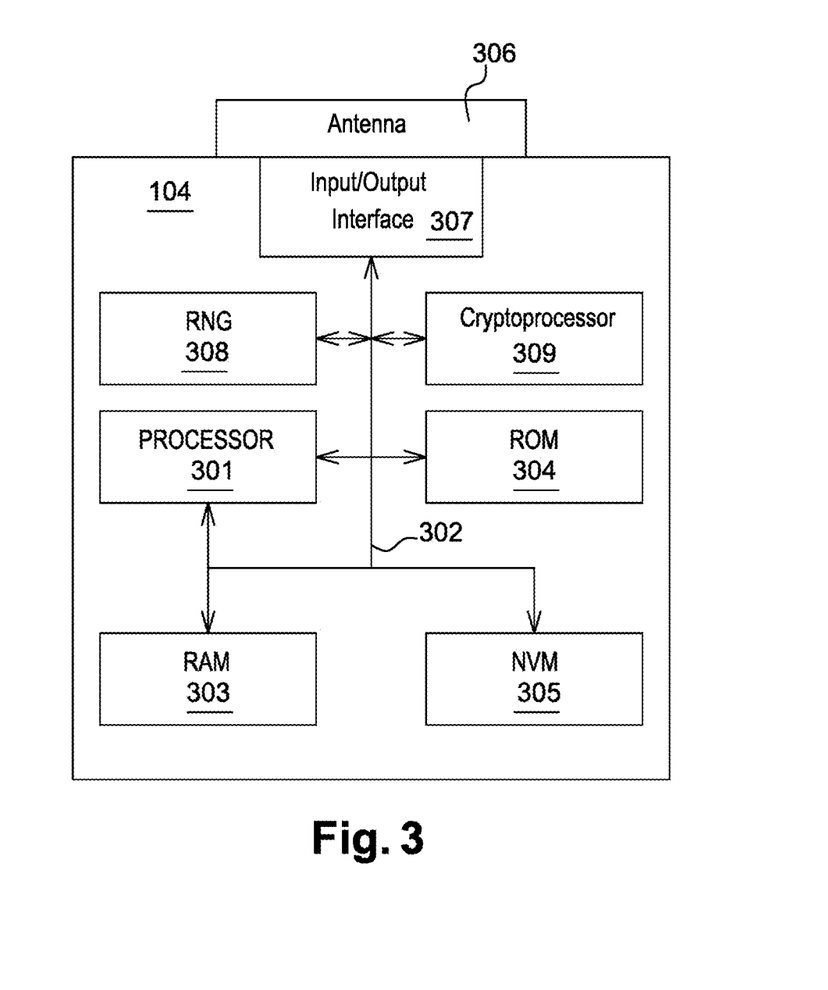
FIG. 3 is a schematic illustration of a tamper-proof computing device according to an embodiment of the present invention.

FIG. 3 is a schematic illustration of such a tamper-proof computing device 104. It may include a processor 301 connected via a bus 302 to a random access memory (RAM) 303, a read-only memory (ROM) 304, and/or a non-volatile memory (NVM) 305. It may further include a connector connected to the bus and by which it may be connected to an antenna 306. Such an antenna may be used to connect the node to various forms of wireless networks, e.g., wide-area networks, WiFi networks, or mobile telephony networks for exchanging messages with the nodes. Alternatively, the tamper-proof computing device may connect to networks via wired network connections such as Ethernet. It may also include an input-output interface 307 providing interfaces to an administrator, such as one or more screens, loudspeakers, a mouse, tactile surfaces, a keyboard etc. . . .

Each tamper-proof computing device shall also comprise a random number generator (RNG) 308 for generating random numbers to be used in the consensus protocol according to the invention. In order to prevent rogue nodes from using fake random numbers for gaining the right to append data to the ledger, there shall be a proof that a given random number was generated by a given tamper-proof computing device for a given node. Consequently, each tamper-proof computing device shall also comprise a cryptoprocessor 309 for generating signatures and shall be configured for securely managing at least one digital key to be used for generating said signatures. Said digital keys may be stored in the read-only memory (ROM) 304, or the non-volatile memory (NVM) 305 of the tamper-proof computing device.

Such tamper-proof computing devices may for example be a Hardware Security Modules HSM. Such a HSM is a tamper resistant hardware device, extremely difficult to access for unauthorized users. It includes a secure random number generator and enables to securely generate and store cryptographic keys, and to securely perform cryptographic operations.

The system according to the invention comprising the nodes 102 and the network 103 shall comprise such a tamper-proof computing device 104. This tamper-proof computing device may be shared between at least two nodes of the network, i.e. used by at least two nodes for getting a random number during a consensus process. Ultimately, the system may only comprise a single tamper-proof computing device 104 shared between all the nodes participating to the ledger. Alternatively, the system may comprise one tamper-proof computing device for each node of the network.

Figure 4:
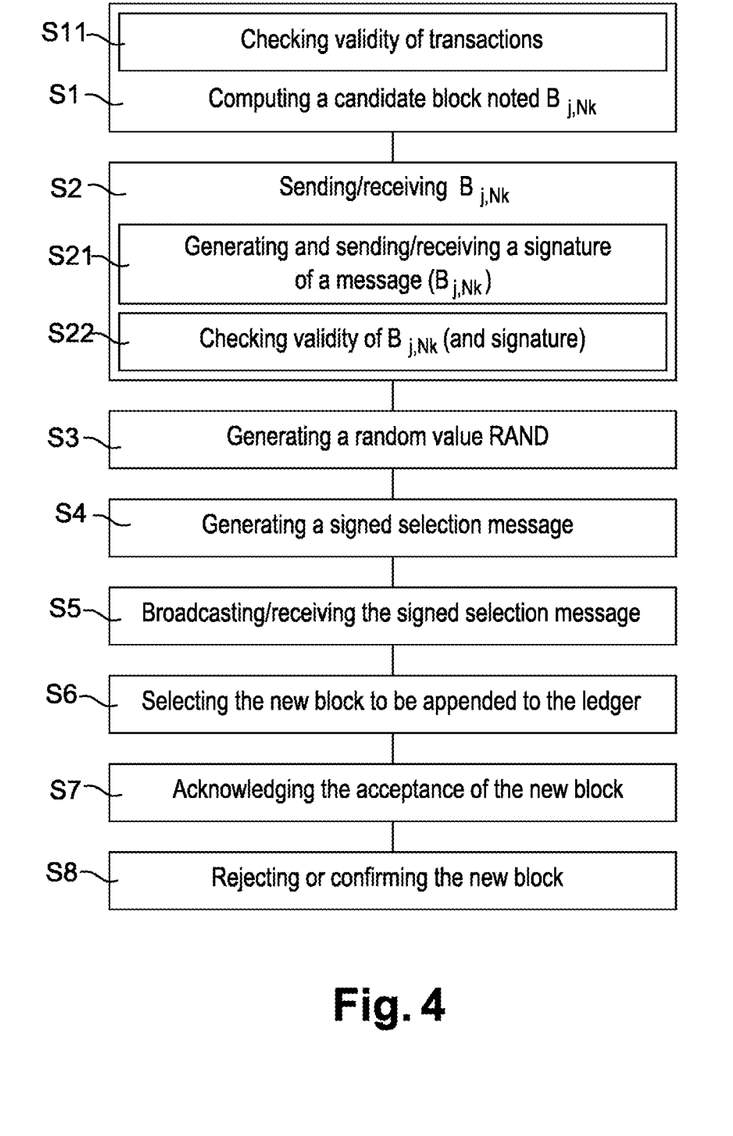
FIG. 4 illustrates schematically a method for reaching a consensus for appending, at a current round, a new block of data to a permissioned ledger distributed through a network according to an embodiment of the present invention.

More precisely, according to a first aspect of the invention, in order to reach a consensus for appending, at a current round j, a new block of data noted $B_{j,N_k}$ to the permissioned ledger, the nodes $N_k$ 102 and at least one hardware computing device 104 described above may be configured to perform the following steps described in FIG. 4, for a set of transactions to be validated. Such transactions may include digital-currency transactions using pseudonyms, financial transactions with authentication of the payer, exchange of assets, smart contracts. They may also simply consist in a recording of data, later usable as a proof, or a recording of a hash of data in order to avoid disclosing such data to the other participants to the ledger.

Such a set of transactions to be validated includes all the transactions at a given time waiting for being appended to the ledger. It is possible that all the authorized nodes do not share exactly the same set of transactions to be validated, e.g. due to latency problems, packet loss or possibly cheating.

In a first step S1, at least one first node 102 $N_k$ computes a candidate block noted $B_{j,N_k}$ on transactions among said set of transactions to be validated. Such a block includes transactions that the first node suggests to append to the ledger in the next block of the ledger.

Such transactions may be only the valid transactions among the set of transactions to be validated. For that, in a first validation step S11, the at least one first node $N_k$ checks the validity of transactions belonging to the set of transactions to be validated before computation of a candidate block $B_{j,Nk}$ on valid transactions. The nodes may verify for example the authenticity of the transactions, detect double spending and check time stamping.

Then the at least one first node $N_k$ 102 sends to the tamper proof computing device 104 its computed candidate block $B_{j,Nk}$ in a second step S2. If validity of the transactions has been verified, the node may also send to said computing device information about said valid transactions on which said node computed said candidate block.

Optionally, in a first signature step S21, the at least one first node may generate a signature of a message comprising the computed candidate block $B_{j,Nk}$ and send said signature to the tamper proof computing device. By doing so, it gives a proof that the candidate block has been generated by an authorized node of the ledger.

In the second step S2, the tamper proof computing device 104 is configured for receiving through its interface at least one candidate block $B_{j,Nk}$ from one first node. During this step the tamper proof computing device 104 may receive a candidate block from multiple first nodes.

Optionally, in a second validation step S22, it may then check the validity of these candidate blocks, for example by checking the validity of the transactions included in the blocks.

When at least one first node sent a signature for a candidate block to the tamper proof computing device during the first signature step S21, the tamper proof computing device 104 is also configured for receiving through its interface such a signature during this step, and it may also verify this signature. Thus it may authenticate the sender node $N_k$ and verify the integrity of the received candidate block $B_{j,Nk}$.

In a third step S3, for each received candidate block, the tamper proof computing device 104 uses then its random number generator 308 for generating a random value RAND. Such a random value RAND may be a 128-bit value for example.

In a fourth step S4, the tamper proof computing device 104 uses also its cryptoprocessor 309 for generating a signed selection message by signing a selection message comprising an identifier of the current round j, said received candidate block $B_{j,Nk}$ and said generated random value RAND. For that, it can use an asymmetric cryptographic process using private/public key pairs managed by itself.

Optionally, the selection message may also comprise the block $B_{j-1}$ selected to be appended to the ledger at the last round j-1. It may help the nodes receiving it to store a local copy of the ledger. It may also help the nodes to identify communication issues, and possibly issue alerts, when multiple incoherent selection messages are received.

Then, in a fifth step S5, the tamper proof computing device 104 broadcasts, through its interface 307, said signed selection messages to the nodes 102 of said network 103. By doing so, each candidate block is associated to a given random number and all nodes of the ledger are made aware of this association. Such associations being certified by the signature of the selection messages, no other number can be fraudulently associated to a given candidate block without all the nodes noticing a fraud attempt.

Finally, in a sixth step S6, the nodes 102 select the new block to be appended to the ledger for the current round based on said random values comprised in said received signed selection messages.

For that a decision rule shall be defined when the permissioned ledger is created. This decision rule may later evolve if this evolution is planned in a pre-established set of rules applying to the ledger.

For example each node may select as the new block to be appended to the ledger for the current round the candidate block comprised in the signed selection message comprising the highest or lowest random value among received signed selection messages comprising the identifier of the current round. Any other decision rule enabling to draw a particular random value among the values included in all received signed selection messages comprising the identifier of the current round may be used.

Each node may for example select as the new block to be appended to the ledger for the current round the candidate block comprised in the selection message comprising the random value which is the closest to a predetermined target value, such as the current date, among received signed selection messages comprising the identifier of the current round. This target value may be previously made public to all nodes of the network.

There is a very low probability that two candidate blocks are associated to the same random number and that this random number meets the criterion for the selection of the new block to be appended to the ledger. In that case, the round should be restarted and a field should be added in the signed selection message that indicates that it is a second attempt for this round.

Optionally, the nodes may memorize, each time a block is selected, the identity of the tamper proof computing device that generated the random value and the selection message for that block. When more than one tamper proof computing device is used, the nodes may compute for each tamper proof computing device statistics on the probability that a candidate block for which this tamper proof computing device has broadcasted a selection message is selected as the new block to be appended to the ledger. In case a particular tamper proof computing device shows quite different statistics than the other ones, a malfunction or a cheating attempt can be suspected.

When a new block $B_1$ is thus selected to be appended to the ledger, at least one node $N_i$ may be configured for acknowledging, in a seventh step S7, the acceptance of the new block by generating and sending to the other nodes of the network a signed acknowledgment message. It enables the nodes to collectively check that the choice of the new block is shared between all participants to the ledger.

This signed acknowledgment message may include at least one data among:
- the new block selected to be appended to the ledger $B_j$ at the current round or an identifier of this new block j,
- the block selected to be appended to the ledger at the last round $B_{j-1}$ or an identifier of this block,
- information about the transactions on which said selected new block $B_j$ at the current round j has been computed and that have also been successfully checked for validity by said node $N_i$, for example not authentic or double-spending,
- information about the transactions on which said selected new block $B_j$ at the current round j has been computed and that have been detected by said node $N_i$ as invalid,
- information about the transactions on which said selected new block $B_j$ at the current round j has been computed and that have been detected by said node $N_i$ as suspicious,
- information about the transactions on which said selected new block $B_1$ at the current round j has been computed and that have not been received by said node $N_i$.

In an eighth step S8, said new selected block $B_j$ is then rejected or confirmed by the nodes 102 of the network 103 based on the data comprised in said signed acknowledgment messages and rules of the permissioned ledger. For example, it may be rejected when some transactions have been reported as being "not valid" by several nodes or when some transactions have been reported as being "not received" by several nodes.

When the new selected block $B_j$ is rejected, the nodes may select as the new block to be appended to the ledger for the current round another candidate block, for example the candidate block comprised in the selection message comprising the second highest or lowest random value among received signed selection messages comprising the identifier of the current round. Then a new phase of acknowledgement may be started with the nodes 102.

According to a second aspect, the invention is also related to a computer program product directly loadable into the memory of at least one computer, comprising software code instructions for performing the steps of the method according to the first aspect when said product is run on the computer.

According to a third aspect, the invention is also related to a tamper-proof computing device as described above, performing the steps described above and configured for managing securely digital keys and comprising a random number generator 308, a cryptoprocessor 309 for generating signature with said keys and an input-output interface 307 wherein, for a set of transactions to be validated:

said interface is configured for receiving, from at least a first node $N_k$, a candidate block $B_{j,Nk}$ computed by said first node on transactions among said set of transactions, said random number generator is configured for generating for each received candidate block a random value RAND, said cryptoprocessor is configured for generating, for each received candidate block, a signed selection message comprising: an identifier of the current round j, said received candidate block $B_{j,Nk}$ and said random value RAND generated for said received candidate block $B_{j,Nk}$, said interface is configured for broadcasting said signed selection messages to the nodes of said network, enabling them to select the new block to be appended to the ledger for the current round based on said random values comprised in said signed selection messages.

According to a fourth aspect, the invention is also related to a system as described above and comprising, for a set of transactions to be validated:

at least one tamper-proof computing device HSM 104 according to the third aspect and, nodes 102 of said network 103, each configured for:
computing a candidate block $B_{j,Nk}$ on transactions among said set of transactions,
sending to said tamper-proof computing device the computed candidate block $B_{j,Nk}$,
receiving said signed selection messages from said tamper-proof computing device,
selecting, among the candidate blocks comprised in the received signed selection messages, the new block to be appended to the ledger for the current round based on said random values comprised in said signed selection messages.

In addition to these features, the tamper-proof computing device 104 according to the third aspect of the invention and the system according to the fourth aspect of the invention may be configured for performing any other steps of the method described here before.

As a result, such a consensus method and associated tamper-proof computing device allow nodes of a ledger to come to a consensus at a very low cost, without requiring a long waiting time or a large amount of calculation, while still enabling a secure operation of the ledger, preventing any node from fraudulently appending data to the ledger without complying to the rules of the ledger.

The invention claimed is:

1. A method for reaching a consensus for appending, at a current round (j), a new block of data to a permissioned ledger distributed through a network of network-connected devices authorized by the ledger, called nodes, said method being performed by a tamper-proof computing device configured for managing securely digital keys and comprising a random number generator and a cryptoprocessor for generating signatures with said keys, and the method comprising, for a set of transactions to be validated, the steps of:

receiving, by said tamper-proof computing device, from at least a first node ($N_k$), a candidate block ($B_{j,Nk}$) computed by said first node on transactions among said set of transactions;

for each received candidate block, generating a random value by the random number generator of said tamper-proof device, and generating, by said cryptoprocessor of said tamper-proof device, a signed selection message comprising: an identifier of the current round (j), said received candidate block ($B_{j,Nk}$) and said random value generated by said cryptoprocessor; and broadcasting, by said tamper-proof device, said signed selection messages to the nodes of said network, enabling the nodes to authenticate the selection message and to select the new block ($B_j$) to be appended to the ledger for the current round based on said random values comprised in said signed selection messages.

2. The method of claim 1, comprising receiving from said first node a signature of a message comprising the candidate block computed by said first node ($B_{j,Nk}$).

3. The method of claim 1, comprising, when receiving said candidate block ($B_{j,Nk}$), checking the validity of the candidate block ($B_{j,Nk}$).

4. The method of claim 1, wherein said signed selection message comprises also the block selected to be appended to the ledger at the last round ($B_{j-1}$).

5. A computer program product directly loadable into the memory of at least one tamper-proof device having a random number generator, the computer program product comprising software code instructions for performing, when said product is run on the tamper-proof device, a method comprising the steps:

receiving, by said tamper-proof device, from at least a first node ($N_k$), a candidate block ($B_{j,Nk}$) computed by said first node on transactions among a set of transactions;

for each received candidate block, generating a random value by the random number generator of said tamper-proof device, and generating, by said cryptoprocessor of said tamper-proof device, a signed selection message comprising: an identifier of a current round (j), said received candidate block ($B_{j,Nk}$) and said generated random value generated by said cryptoprocessor; and broadcasting, by said tamper-proof device, said signed selection messages to the nodes of said network, enabling the nodes to authenticate the selection message and to select the new block ($B_j$) to be appended to the ledger for the current round based on said random values comprised in said signed selection messages.

6. A tamper-proof computing device for reaching a consensus for appending, at a current round (j), a new block of data to a permissioned ledger distributed through a network comprising network connected devices authorized by the ledger, called nodes, said tamper-proof computing device being configured for managing securely digital keys and comprising a random number generator, a cryptoprocessor for generating signatures with said keys and an input-output interface wherein, for a set of transactions to be validated:

said interface of said tamper-proof device is configured for receiving from at least a first node ($N_k$), a candidate block ($B_{j,Nk}$) computed by said first node on transactions among said set of transactions;

said random number generator of said tamper-proof device is configured for generating a random value for each received candidate block;

said cryptoprocessor of said tamper-proof device is configured for generating, for each received candidate block, a signed selection message comprising: an identifier of the current round (j), said received candidate block ($B_{j,Nk}$) and said random value generated for said received candidate block ($B_{j,Nk}$);

said interface of said tamper-proof device is configured for broadcasting said signed selection messages to the nodes of said network, enabling the nodes to authenticate the selection message and to select the new block to be appended to the ledger for the current round based on said random values comprised in said signed selection messages.

7. A system for reaching a consensus for appending, at a current round (j), a new block of data to a permissioned ledger distributed through a network comprising network connected devices authorized by the ledger called nodes, said system comprising, for a set of transactions to be validated:

nodes of said network, each configured for:
computing a candidate block ($B_{j,Nk}$) on transactions among said set of transactions;
sending to a tamper-proof computing device the computed candidate block ($B_{j,Nk}$);
receiving a signed selection message from said tamper-proof computing device; and a tamper-proof computing device being configured for managing securely digital keys, the tamper-proof device having:
a random number generator;
a cryptoprocessor for generating signatures with said keys, and
an input-output interface wherein;
for a set of transactions to be validated:
said interface is configured for receiving, from at least a first node ($N_k$), a candidate block ($B_{j,Nk}$) computed by said first node on transactions among said set of transactions;
said random number generator is configured for generating a random value for each received candidate block;
said cryptoprocessor is configured for generating, for each received candidate block, a signed selection message comprising: an identifier of the current round (j), said received candidate block ($B_{j,Nk}$) and said random value generated for said received candidate block ($B_{j,Nk}$); and
said interface is configured for broadcasting said signed selection messages to the nodes of said network, enabling the nodes to authenticate the selection message and to select the new block to be appended to the ledger for the current round based on said random values comprised in said signed selection messages; and each said node further configured for:
selecting, among the candidate blocks comprised in the received signed selection messages, the new block to be appended to the ledger for the current round based on said random values comprised in said signed selection messages.

8. The system of claim 7, wherein each node is configured for selecting as the new block to be appended to the ledger for the current round the candidate block comprised in the signed selection message comprising the highest random value among received signed selection messages comprising the identifier of the current round.

9. The system of claim 7, wherein the first node is configured for generating a signature of a message that comprises the candidate block ($B_{j,Nk}$) and for sending said signature to the tamper-proof computing device.

10. The system of claim 7, wherein said tamper-proof computing device is shared between at least two nodes of said network.

11. The system of claim 7, comprising one tamper-proof computing devicefor each node of said network.

12. The system of claim 7, wherein the first node ($N_k$) is configured for checking the validity of transactions ($T_{i,j}, \ldots, T_{i,j}$) of said set of transactions and for computing said candidate block ($B_{j,Nk}$) only on valid transactions of said set of transactions.

13. The system of claim 12, wherein:
each node is configured for sending to said tamper-proof computing device information about said valid transactions on which said node computed said candidate block.

14. The system of claim 13, wherein, when a new block ($B_j$) is selected to be appended to the ledger, at least one node ($N_i$) is configured for acknowledging the acceptance of the new block by generating and sending to the other nodes of the network a signed acknowledgment message including at least one data among:
the new block selected to be appended to the ledger ($B_j$) at the current round or an identifier of said new block (j),
the block selected to be appended to the ledger at the last round ($B_{j-1}$) or an identifier of said block,
information about the transactions on which said selected new block ($B_j$) at the current round (j) has been computed and that have also been successfully checked for validity by said node (Ni),
information about the transactions on which said selected new block ($B_j$) at the current round (j) has been computed and that have been detected by said node (Ni) as invalid,
information about the transactions on which said selected new block ($B_j$) at the current round (j) has been computed and that have been detected by said node (Ni) as suspicious, and
information about the transactions on which said selected new block ($B_j$) at the current round (j) has been computed and that have not been received by said node (Ni);
and wherein the nodes of the network are configured for rejecting or confirming said new selected block ($B_j$) based on the data comprised in said signed acknowledgment messages.

15. The system of claim 14, wherein when the selected new block ($B_j$) at current round (j) is rejected, each node is configured for selecting as the new block to be appended to the ledger for the current round, the candidate block comprised in the selection message comprising the second highest random value among received signed selection messages comprising the identifier of the current round.

* * * * *